Oct. 6, 1931.  E. ROBERTS  1,826,675

DRIVE TRANSMISSION FOR CENTRIFUGALS

Filed June 15, 1928  2 Sheets-Sheet 1

Inventor
Eugene Roberts
by Geo. N. Goddard,
Attorney

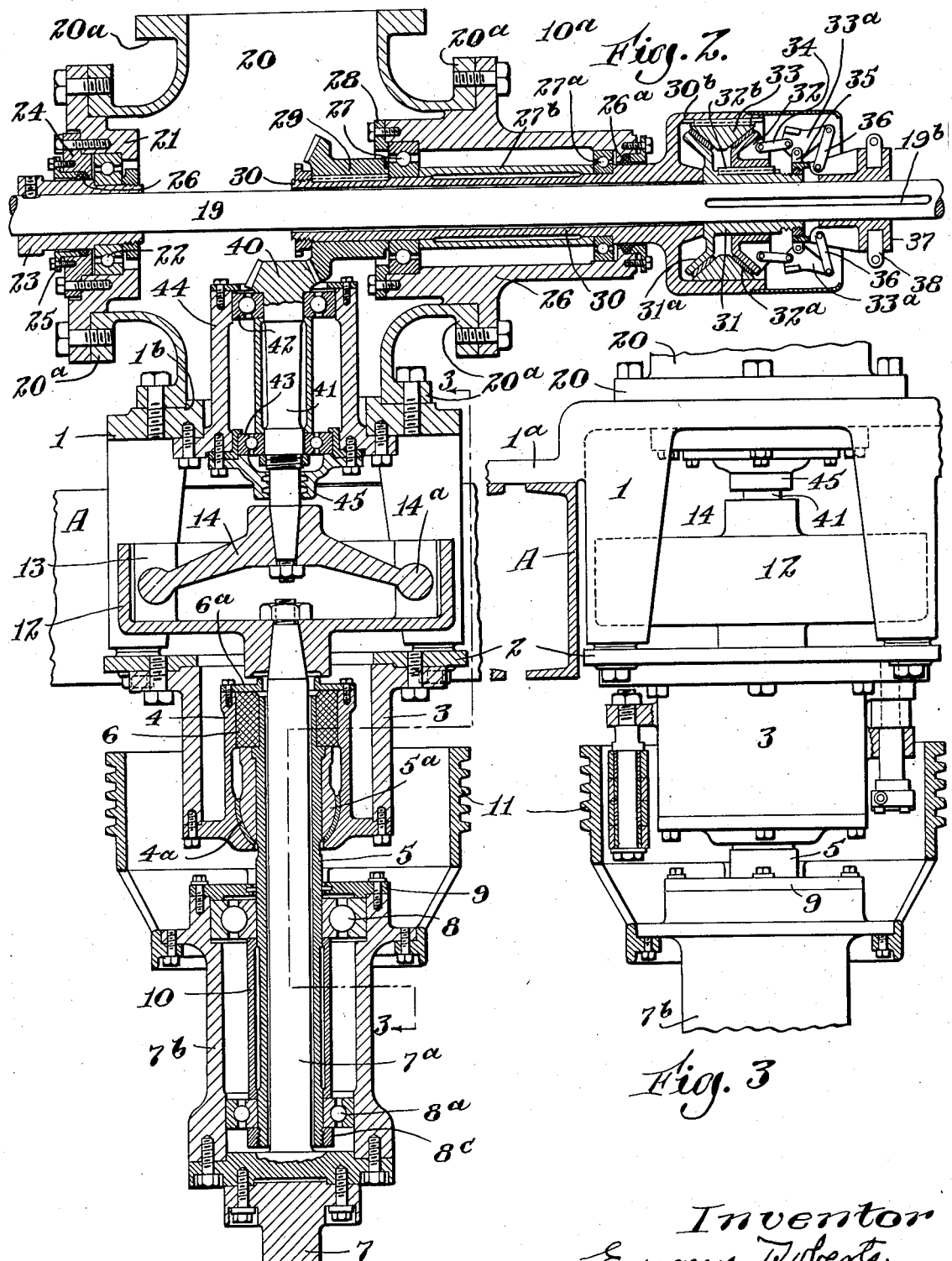

Patented Oct. 6, 1931

1,826,675

UNITED STATES PATENT OFFICE

EUGENE ROBERTS, OF HASTINGS, NEW YORK, ASSIGNOR TO THE WESTERN STATES MACHINE COMPANY, OF SALT LAKE CITY, UTAH, A CORPORATION OF UTAH

DRIVE TRANSMISSION FOR CENTRIFUGALS

Application filed June 15, 1928. Serial No. 285,774.

This invention relates to centrifugal apparatus, particularly of the type used in the purification of sugar and other solid materials through centrifugal extraction of their liquid content. It deals more particularly with the drive transmission by which a series of gyratory centrifugals, suspended side by side, are driven at operative speed.

In the last quarter century there has been a marked trend in this field toward the use of direct connected electric motor driven centrifugals in lieu of the old belt driven centrifugals, in spite of the fact that the cost of a motor driven machine is much greater than that of a belt driven machine.

The present improvements are intended to provide a practically efficient and economical arrangement for driving centrifugals that shall have all the advantages of the electrically driven machine and other advantages besides, while at the same time largely reducing the expense of installation and economizing in the consumption of power and in the maintenance cost of the machines.

In order to minimize the time required to bring a centrifugal from a state of rest up to full operative speed of say about 1100 R. P. M., the direct connected motor initially uses approximately 40 H. P. while, after reaching full speed, only 6 to 8 H. P. is required to maintain the machine in operation. Moreover, each individual motor, arranged as it is directly above the open basket of the centrifugal, is, even when placed in a protective housing, quite exposed to the fumes arising from the basket as well as to the water which is occasionally turned upon the apparatus by means of a hose to wash or clean it.

According to my present invention I provide an arrangement embracing a horizontal line shaft extending along the front of the mixer trough in suitable bearings, and driven by a motor connected to one end of the shaft, and a plurality of individual gyratory centrifugals suspended beneath the line shaft, each independently driven by means of its own manually controlled clutch arranged in series with a lost motion clutch having suitable driving connection with the centrifugal to avoid lateral strains, and enabling the centrifugal to pick up speed without sudden shock tending to disrupt or injure the driving connection. Provision is also made for proper and complete lubrication of the power transmission bearings and for protecting the bearings from fumes from the basket and from wash water. These and other features of the invention will be particularly described in the following specification and will be defined in the claims annexed.

In the drawings I have illustrated a simple and convenient arrangement embodying the principles of this invention, in which Fig. 1 is a front elevation showing two of the battery of centrifugal machines arranged side by side and in their proper relation to the line shaft and the power transmitting devices.

Fig. 2 is a vertical, central section showing on an enlarged scale the construction and arrangement of the transmission which drives one centrifugal machine from the common line shaft.

Fig. 3 is a side elevation of the construction shown in Figure 2.

Figure 1:
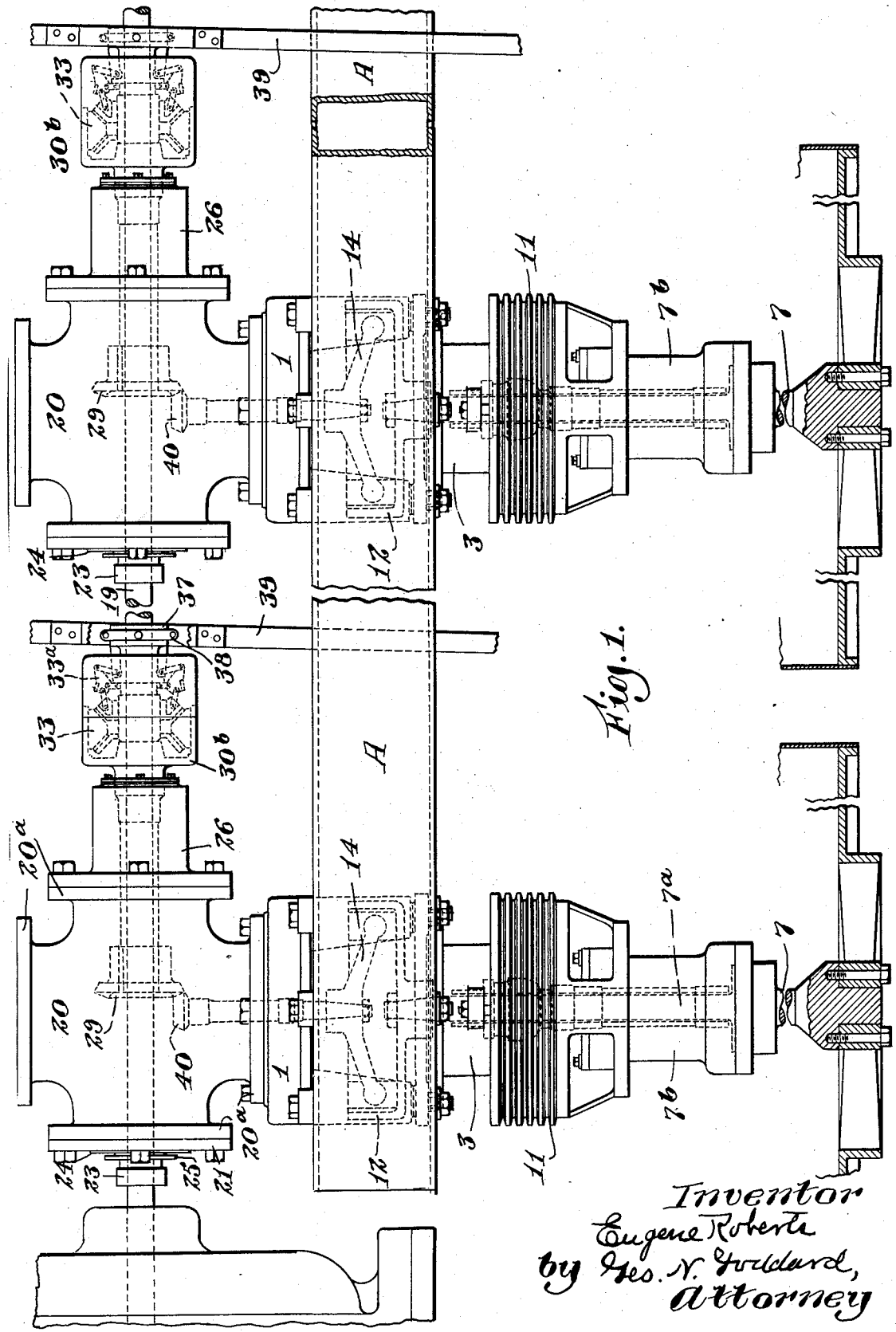

The centrifugals illustrated in the accompanying drawings are of the gyratory, solid shaft, overhead suspension type, its particular construction however forming no part of the present invention.

On horizontal channel beams A forming part of the framework of the centrifugal apparatus is mounted a supporting hollow frame 1 of general box-like appearance, with open sides to permit access to the interior, in which is mounted the centrifugal flexible-connection clutch presently to be described. This supporting frame is secured to the horizontal beams A, which run along in front of the mixer by means of flanged extensions 1ª resting upon these beams. To the lower end of this supporting frame is bolted a suspension plate 2 and to this suspension plate is bolted the hollow centrifugal hanger 3 provided with an interior socket member 4 provided with a spherically curved bearing seat 4ª for supporting the spherically curved ball portion 5ª of a vertical gyratory, non-rotatable suspension quill 5, whose upper end is engaged by an annular elastic buffer 6, which is interposed between the socket hanger 4 and the upper end of the gyratory quill, between which it is compressed by an annular compression plate 6a which is drawn down tightly upon it by means of attaching bolts. The upward extension 7a of the solid basket shaft 7 projects up through the quill and at its upper end carries a securely fastened clutch pulley 12, inside of which are loosely mounted weighted blocks 13 of arcuate form, between which project the ball paws 14a of a radial spider 14, which forms the driving member of the clutch. It will be understood that when the spider 14 is rotated the ball paws 14a push around inside the pulley 12 the loose weighted blocks 13 which, by their friction, increased by the centrifugal pressure due to their revolution, acts to rapidly accelerate the centrifugal to normal operative speed which is usually about 1100 R. P. M. The degree of acceleration may be varied by varying the weight of the centrifugal friction blocks 13. The upward extension 7a of the basket shaft is firmly secured to the main portion 7 of that shaft by flange and bolt connection, to which flange is also secured an outer tubular extension member of the basket shaft 7b, which serves both as a means for suspending the entire basket shaft from the thrust bearing and also as a lubricating chamber carrying an abundant supply of lubricant for these bearings.

An upper radial ball bearing element 8 and a lower radial ball bearing element 8a are interposed between the outer section 7b of the basket shaft and the exterior of the quill 5, the two being held in spaced relationship by a tubular sleeve 10, which also supports the downward thrust carried by the upper bearing 8, said thrust being transmitted through the inner ring of the lower bearing to a sustaining nut 8c tightly secured on the lower end of the quill. The upper ball bearing element has the races deeply cut to serve also as a thrust bearing to sustain the axial thrust of the centrifugal, this thrust being transmitted through a cover 9 securely bolted to the upper end of the hollow shaft section 7b, to the outer ring of the bearing element, thence through the bearing balls themselves to the inner ring and downwardly to the thrust nut 8c.

A suitable brake pulley 11, adapted to receive the usual expanding shoes of an internal brake, is secured to the shaft section 7b by a flange and bolt connection.

I will now describe the driving transmission by which the individual centrifugal machines of the battery are driven. Mounted upon the individual supporting frame 1 is a hollow bearing casing 20, whose top, bottom and opposite sides are provided with large circular openings having attaching flanges 20a at their edges. Inside one lateral opening is mounted a bearing head 21 securely bolted to the adjacent flange 20a. This bearing head is centrally bored to receive a ball bearing element 22 interposed between an interior sleeve or collar 23, that is secured to the line shaft 19, and the surrounding portion of the head 21. At its outer side, the head 21 is provided with a packing gland 24 having a follower 25 for compressing a packing wick 26 to prevent leakage of the lubricant through the head from the interior of the casing.

The opposite opening in the bearing casing 20 receives an elongated tubular or annular bearing member 26, which is securely attached to the adjacent flange 20a by a flange and bolt connection. At its inner end this tubular bearing head 26 is rabbeted to receive the outer ring of a ball bearing element 27, which is securely fastened therein by a clamping ring 28. The inner or rotating race ring of this bearing element is secured to an elongated sleeve 29 which projects through the head into the inside of the casing 20 and which carries a mitre gear 29 suitably splined or fastened to this end of the sleeve 30. The outer end of this sleeve 30 projects beyond the outer end of the tubular head 26 and is supported by another radial ball bearing 27a. Leakage of the lubricant is prevented by a packing gland 26a. A spacing sleeve 27b is interposed between the ball bearing elements 27 and 27a to keep them properly positioned and also to support against endwise thrust the inner ball race of the deep cut radial bearing 27, which is due to the pressure on the mitre gear 29.

The loose sleeve 30 may be clutched to the line shaft 19 by any suitable type of clutch that gives a powerful gripping action practically free from slip. The clutch herein shown is of a well known type and comprises a collar 31 splined to the line shaft by means of the spline groove 19b and having an outwardly inclined annular flange 31a in conjunction with a cooperating gripping collar 32 that has an annular oppositely inclined or flared flange, and is slidable axially upon the collar 31 with which it has a splined connection as shown at 32b.

The loose sleeve 30, at its outer end, is provided with an offset flange 30b, to the inside of which is firmly secured a ring 33 of wedge shape whose inclined inner faces correspond to the inclination of the flanges 31a and 32a of the two opposed gripping members. A gripping toggle is used to powerfully force the two gripping members into gripping engagement with the oppositely bevelled link 33. This comprises toggle links 33 and 34 forming a toggle joint connection between the slidable gripping member 32 and an adjustable link 35 secured on the outer end of the collar 31. These toggle couples are forced toward a straight line position by means of links 36 pivotally attached to the outer ends of the toggles 33 and also to the inner end of a slidable shipper sleeve 37, which is grooved to receive the yoke 38 of the shipper lever 39. It will be understood that when the shipper sleeve 37 is forced inwardly toward the clutch to, or beyond, the dead centre position, the links 36 force the outer ends of the toggle links 33 outwardly, thereby tending to straighten the toggle and force the gripping sleeve 32 into powerful engagement with the adjacent face of the link 33 secured to the inside of the flange 30$^b$ of the loose sleeve 30, which carries the mitre gear 29. By reason of the fact that the link 35 is fulcrumed on a part of the collar 31, the axial thrust of both gripping members upon the wedge-shaped link will be equal and thus a double friction afforded that is practically free from slip. On the other hand the movement of the shipper lever toward the right releases the clutch so that no driving connection is established between the mitre gear 29 and the line shaft 19. We have, therefore, a very powerful and positive gripping action by which the clutching and the releasing of the mitre gear sleeve to and from the line shaft is under the easy control of the machine operator.

Transmission of power from the line shaft through the clutch to the centrifugal is effected by means of the mitre gear 29 intermeshing with a mitre gear 40 secured on a vertical shaft 41, which is mounted in upper and lower radial bearings 42, 43 that are secured inside a vertical tubular box or housing 44. To the lower end of this vertical transmission shaft 41 is secured the centrifugal clutch spider 14 whose action has already been described. The upper ball bearing element 42 has its races deeply cut to sustain the axial thrust against the mitre gear 40 secured to the upper end of the shaft. The lower end of this tubular shaft casing is bolted to the underside of the top of the individual frame 1 by a flange and shoulder connection, which properly centres the bearing casing and the opening at the bottom through which the shaft 41 passes is provided with a packing gland member 45 to prevent the escape of lubricant inside the bearing casing 44.

The operation and the advantage of the above described construction will now be explained. As the line shaft is common to all the centrifugals and is driven from a driving connection or motor indicated at X at one end of the shaft, it will be seen that there is no necessity of employing the motor horsepower heretofore used under the individual unit system of direct connected motors. A single motor of from 80 to 100 H. P. is ample to take care of all requirements and bring the individual centrifugals up to speed with the desired quickness of acceleration. The machines are never, in practice, all started together but one after the other. As each individual machine is thrown into operative driving connection with the line shaft, it will be seen that a motor of the stated capacity is more than sufficient to start the machine and also to maintain the normal operative speed of any machines that may already be connected with the line shaft, in view of the fact that when a centrifugal has once reached its normal operative speed it requires only 6 or 8 H.P. to keep it running at that speed. Suppose then that there is a battery of six machines. Suppose that five of them are actually running at normal speed and the sixth one is at rest. Obviously the five machines running will not require more than 35 or 40 H. P. to keep them so running, while there is an ample margin of power to quickly pick up the other machine, in which it is assisted by the momentum of the machines already running. Instead of six motors of 35 to 40 H. P. each, each requiring individual attention, care and maintenance, there is but one motor of less than 100 H. P. located so as to be out of direct range of the fumes from the basket and away from the wash water with which the whole apparatus is drenched in the washing operation. By reason of the double clutch connection each machine may be started in operation without any sudden jerk or shock. The clutching of the mitre gear sleeve 30 to the line shaft is accomplished almost instantaneously, so that that sleeve and the permanently interconnected transmission shaft 41 are instantly rotating at full speed and, being mounted on ball bearings and having no great weight of inertia, they respond instantly to the clutch connection that is under the control of the operator. On the other hand, it takes a few seconds for the centrifugal clutch to reach its maximum efficiency so that the centrifugal itself is started easily without shock and picks up with rapidly increasing acceleration as the centrifugal blocks respond to the action of their driving spider 14. The basket shaft is free to oscillate against the centralizing resistance of its buffer 6 without bringing any lateral strain or pressure against the lower end of the transmission shaft 41. All the bearings are easily accessible for inspection or replacement, which is seldom required because of the fact that the entire bearing casing may be filled with lubricant which will last for an indefinite period.

On the other hand, when the machine is to be stopped, there is no momentum of a heavy motor to be overcome as in the case of direct connected centrifugal motors, because just as soon as the manually controlled clutch, by which is meant the clutch under the control of the operator, is released only the transmission elements continue to rotate with the centrifugal and even that connection is broken at slow speed when the centrifugal blocks 13 cease to have any effective function. Therefore, each machine is very easily started and stopped while a minimum amount of power is consumed by it, and all this is accomplished by a very large decrease in the expense of installation and of maintenance.

What I claim is:

1. In a centrifugal apparatus the combination with a continuously running horizontal line shaft, of a series of gyratory vertical shaft centrifugals suspended on universal joints below the line shaft, each having independently controlled driving connection with the line shaft through a manually controlled clutch, and a second self-acting friction clutch that is energized through the agency of the manually controlled clutch.

2. In a centrifugal apparatus the combination with a continuously running line shaft, a plurality of gyratory shaft centrifugals suspended beneath the line shaft and having operatively independent driving connections with the line shaft, each connection embracing in series a manually controlled clutch, and a self-acting contrifugal clutch, the latter being rendered gradually operative through the medium of the former when starting each centrifugal.

3. The combination with a horizontal line shaft of a series of loose gears thereon, releasable clutches for coupling each gear at will to the line shaft, a plurality of vertical transmission shafts located beneath the line shaft and operatively connected with the respective loose gears, a plurality of gyratory shaft centrifugals mounted below and in axial alignment with the respective transmission shafts, each centrifugal being operatively connected with its overhead transmission shaft by a self-acting friction clutch forming a flexible driving connection between the centrifugal and its transmission shaft to permit gyration of the centrifugal.

4. The combination with a continuously running horizontal line shaft, of a series of bearing casings provided with lateral openings, hollow bearing heads secured in said openings, each provided with radial bearings adapted to resist end-thrust of the line shaft supported therein, a rotatable sleeve loosely mounted in one of said bearing heads combined with a manually operated clutch for clutching it to the line shaft at will, a vertical transmission shaft supported in a vertical head secured in a bottom opening of said bearing casing, and having at its upper end gearing connection with said rotatable sleeve, a gyratory shaft centrifugal suspended below and in axial alignment with said vertical transmission, and having flexible driving connection therewith acting to start the machine in operation with increasing frictional engagement when the loose sleeve has been clutched to the line shaft.

5. The combination with a fixed supporting frame, of a gyratory shaft centrifugal suspended therefrom to gyrate against yielding resistance, the centrifugal shaft being extended upward above the centre of gyration, a friction clutch member secured to said upward extension, a hollow bearing casing provided with lateral and bottom openings, hollow bearing heads secured in said openings, and friction radial bearings mounted in said hollow heads, a horizontal continuously running line shaft passing through two lateral heads, a vertical transmission shaft mounted in the bottom head and provided with a clutch member cooperatively associated with the clutch member secured to the upward extension of the basket shaft, intermeshing gears forming a driving connection between the line shaft and the vertical transmission shaft, and a clutch operable at will for establishing driving connection between the line shaft and said gearing.

6. In a centrifugal apparatus the combination with a suspended gyratory shaft centrifugal and a friction clutch member secured to the upper end of said centrifugal shaft, of an overhead non-gyratory transmission shaft axially aligned with the centrifugal shaft and having flexible driving connection with the aforesaid clutch member by means of centrifugal friction blocks that are energized by the rotation of said transmission shaft, a horizontal line shaft, transmission gearing affording driving connection between the line shaft and the transmission shaft, and a clutch operable at will for establishing and releasing driving connection between the line shaft and said gearing.

7. The combination with a horizontal line shaft of a plurality of gyratory shaft centrifugals suspended below the line shaft side by side, vertical transmission shafts axially aligned with the respective centrifugals between the centrifugals and the line shaft, means controlled by the operator for establishing driving connection between the line shaft and each centrifugal, and means energized by the rotation of each line shaft for automatically establishing frictional driving connection between each transmission shaft and its corresponding centrifugal.

8. The combination with a suspended gyratory shaft centrifugal of an overhead horizontal line shaft, an intermediate non-gyratory transmission shaft axially aligned with said gyratory centrifugal shaft, a clutch operable at will to establish driving connection between the line shaft and the transmission shaft, and a self-acting friction clutch energized by the rotation of the transmission shaft to transmit rotation to the centrifugal shaft with an increasingly powerful friction until the centrifugal reaches normal full speed of operation.

In witness whereof, I have subscribed the above specification.

EUGENE ROBERTS.